US008912924B2

(12) United States Patent
Scofield et al.

(10) Patent No.: US 8,912,924 B2
(45) Date of Patent: Dec. 16, 2014

(54) AUTHORIZATION OF SERVICE USING VEHICLE INFORMATION AND/OR USER INFORMATION

(71) Applicant: INRIX, Inc., Kirkland, WA (US)

(72) Inventors: Christopher L. Scofield, Seattle, WA (US); Scott Marshall Sedlik, Mercer Island, WA (US); Dominic Jason Jordan, Manchester (GB); Uri Lavee, Tel aviv (IL)

(73) Assignee: INRIX, Inc., Kirkland, WA (US)

( * ) Notice: Subject to any disclaimer, the term of this patent is extended or adjusted under 35 U.S.C. 154(b) by 151 days.

(21) Appl. No.: 13/626,355

(22) Filed: Sep. 25, 2012

(65) Prior Publication Data

US 2014/0085110 A1 Mar. 27, 2014

(51) Int. Cl.
*B60Q 1/48* (2006.01)
*G08G 1/14* (2006.01)

(52) U.S. Cl.
USPC .......................... 340/932.2; 340/933; 340/988

(58) Field of Classification Search
CPC combination set(s) only.
See application file for complete search history.

(56) References Cited

U.S. PATENT DOCUMENTS

| | | | | |
|---|---|---|---|---|
| 7,019,670 | B2 | 3/2006 | Bahar | |
| 7,533,809 | B1 * | 5/2009 | Robinson et al. | 235/382 |
| 2004/0012481 | A1 * | 1/2004 | Brusseaux | 340/5.7 |
| 2004/0039632 | A1 * | 2/2004 | Han et al. | 705/13 |
| 2004/0201520 | A1 * | 10/2004 | Flick | 342/357.07 |
| 2004/0254840 | A1 * | 12/2004 | Slemmer et al. | 705/22 |
| 2005/0010478 | A1 * | 1/2005 | Gravelle | 705/16 |
| 2012/0285790 | A1 | 11/2012 | Jones et al. | |

OTHER PUBLICATIONS

International Search Report dated Dec. 5, 2013.

* cited by examiner

*Primary Examiner* — Travis Hunnings
(74) *Attorney, Agent, or Firm* — Cooper Legal Group, LLC

(57) ABSTRACT

Among other things, one or more techniques and/or systems are provided for authorizing an action using vehicle identification information (e.g., supplied by a vehicle) and user identification information (e.g., supplied by a mobile device associated with a user of the vehicle). Such an action may relate to, among other things, refueling the vehicle, parking the vehicle, using a fee-based road segment, and/or other vehicle-centric actions, for example. Moreover, in one embodiment, as part of the authorization, a payment transaction may be initiated by an authorization system configured to authorize the action.

20 Claims, 9 Drawing Sheets

AUTHORIZATION OF SERVICE USING VEHICLE INFORMATION AND/OR USER INFORMATION

BACKGROUND

The availability and ease of credit card systems have altered the way people pay for services, particularly vehicle-centric services. Transactions that used to require interaction with an attendant can now be performed without the aid of an attendant. By way of example, users can pay by credit card at a gasoline pump and/or at a parking establishment, reducing (e.g., to zero) the required interaction with an attendant and reducing the time it takes to complete the transaction.

Today, authorization and/or payment systems have advanced beyond credit card systems to further increase user convenience. By way of example, many toll roads provide frequent travelers with RFID tags that may be mounted to their vehicles. When a vehicle enters and/or exits the toll road, the RFID tag is detected and a user account associated with the RFID tag is billed. As such, the user may not be required to stop at a toll gate to collect a ticket and/or to manually pay a requisite fee. As another example, many parking establishments and/or parking authorities have developed payment applications for mobile devices (e.g., smartphones, tablets, etc.). When a user approaches a parking gate and/or parking meter, the mobile device may communicate with the parking gate and/or parking meter (e.g., via Bluetooth, infrared, etc.) to communicate an identity of the user and/or to communicate a user authorization to debit an account associated with the payment application, for example.

While these more advanced systems have proven useful, there are some drawbacks. For example, these authorization and/or payment systems are often highly fractured. As an example, an RFID tag provided by a first toll road authority may not be accepted by a second toll road authority. Therefore, if a user frequently travels on toll roads controlled by both the first and second toll road authorities, the user may be required to mount two RFID tags to his/her vehicle. Likewise, the payment applications developed by parking establishments and/or parking authorities are often not universal and/or not interoperable. Therefore, a user that frequents multiple garages may be required to install multiple applications, each of which requires its own user account. It may be appreciated that such lack of interoperability may be undesirable to a user because the user may be required to create multiple user accounts and may be required to know which establishment utilizes which application and/or RFID tag, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques are described herein for a centralized authorization and/or payment system. An action to be performed may be authorized based upon both user information, which may be supplied by a mobile device associated with the user, and vehicle information, which may be supplied by a communication system embedded within a vehicle. Such an action typically relates to a mobility service associated with operating a vehicle (e.g., a vehicle-centric action). By way of example, types of actions that may require such authorization include, but are not limited to, refueling the vehicle (e.g., electric vehicle charging), parking the vehicle, toll road authorization, and/or congestion zone authorization.

In one embodiment, when a vehicle is within a predetermined distance of the refueling mechanism, parking establishment, toll gate, etc. the vehicle or the mobile device may communicate the user information and the vehicle information to an authorization system. The authorization system may, in turn, confirm that the user/vehicle combination is authorized to receive the mobility service and communicate the authorization to the refueling mechanism, parking establishment, toll gate, etc. In this way, the authorization is dependent upon both user information (e.g., provided by the mobile device) and the vehicle information (e.g., provided by the vehicle). By way of example, authorization may be denied where the user is authorized for the action but the vehicle is not. Likewise, authorization may be denied where the vehicle is authorized for the action but the user is not.

One or more systems and/or techniques are further described herein for payment collection associated with using a mobility service. By way of example, a credit card and/or other funds account may be associated with the user and/or the vehicle, and as part of authorizing the action, the authorization system may charge the associated account a fee that is accessed by the mobility service provider. In this way, a cost associated with refueling the vehicle, parking the vehicle, etc. may be automatically debited to an account associated with the vehicle and/or the user based upon the supplied user and/or vehicle information. Moreover, where an amount of the fee is not known until after the action is complete (e.g., such as at a refueling station where the amount of fuel required to fill a tank may be unknown until refueling is complete), the initial authorization may include initiating a provisional fee that is updated upon completion of the action, for example. Thus, as part of an authorization, the authorization service may authorize a refueling station to provide up to $75 worth of fuel (e.g., and apply a provisional charge to the debit account to verify that sufficient funds are available). When the refueling station has completed the refueling, the refueling station may report the actual cost of the fuel (e.g., which may be less than $75) to the authorization system and the authorization system may release the provisional charge and debit the account the actual cost of the fuel.

One or more systems and/or techniques are further described herein for communicating the debit of fees to the user and/or alerting the user when the mobility service is about to expire and/or has expired. By way of example, an initial authorization may provide for parking the vehicle at a parking meter for twenty minutes (e.g., and a requisite fee may be debited to an account associated with the user). Prior to the allotted time elapsing, the authorization system, for example, may communicate to the user (e.g., via a message sent to the mobile device associated with the user) an alert notifying the user of the approaching time expiration and/or offering the user the option to extend the time. If the user selects to extend the time, the authorization system may notify the parking meter or the vehicle (e.g., which may in-turn communicate the notice to the parking meter) of the user's request to extend the time remaining on the meter.

The following description and annexed drawings set forth certain illustrative aspects and implementations. These are indicative of but a few of the various ways in which one or more aspects may be employed. Other aspects, advantages, and novel features of the disclosure may become apparent from the following detailed description when considered in conjunction with the annexed drawings.

DETAILED DESCRIPTION

Figure 1:
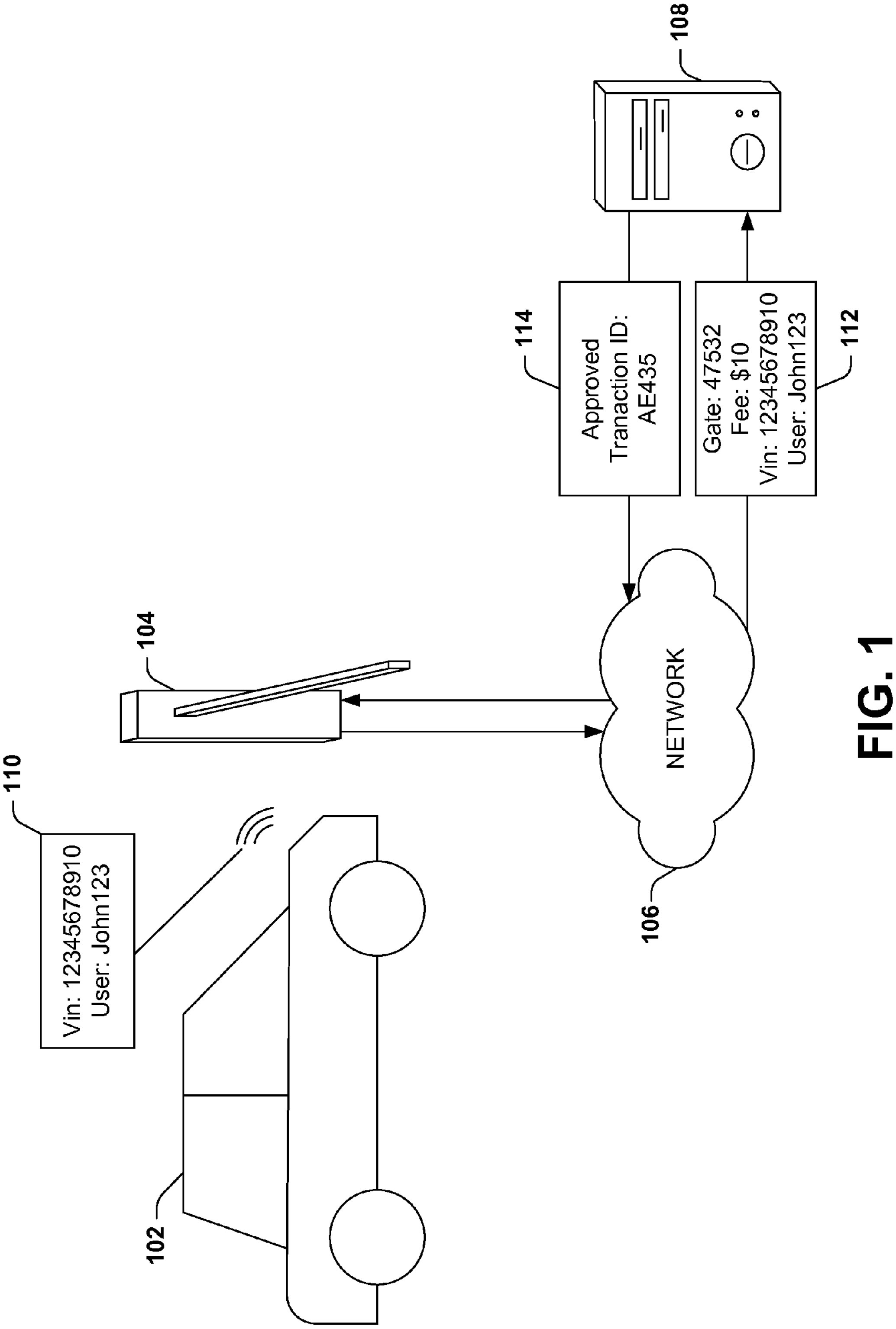
FIG. 1 is an exemplary embodiment for carrying out at least some of the techniques and/or systems described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, authorization and/or payment systems for mobility services are rapidly evolving. For example, many parking establishments and on-street parking meters now offer the option of paying by credit card. Moreover, longer-term subscribers to a parking establishment may be given an RFID tag to place in their vehicles. In this way, when the vehicle approaches a gate at the parking establishment, authorization may be granted without the user stopping at the parking gate and/or inserting a keycard into the parking gate. Similar technology is available to those who frequent toll roads and/or congestion roads (e.g., where the user pays a fee for driving on the road during specified times) to expedite travel times.

Moreover, recent advancements in mobile devices (e.g., mobile telephones, such as smartphones; portable computers, such as personal digital assistants, pocket personal computers, tablet computers, and/or laptop computers; etc.) have been a catalyst for further advancements in authorization and/or payment systems for mobility services. By way of example, some parking establishments now offer applications that are installed on the mobile device. When a user approaches a gate at the parking establishment, the application communicates with the gate via a communication network (e.g., such as a Bluetooth and/or Wi-Fi communication network), a barcode, a QR Code, and/or other unique identifier, for example. The parking establishment then determines whether the user has permission to access the garage (e.g., because of a monthly subscription the user pays to use the garage) and/or debits a user account associated with application and grants the user access to the garage.

While these technological advancements were intended to increase user convenience (e.g., by eliminating key cards, automating payment transactions, etc.), user adoption has been slow due to the highly fractured nature of mobility services. For example, each parking establishment may develop its own application for mobile devices. Thus, a user may be required to install multiple applications, respectively associated with a different user account, to utilize these advancements at various parking establishments. Moreover, the user may be required to know which application is utilized at which parking establishment, further discouraging a user from adopting this technology.

Accordingly, among other things, one or more systems and/or techniques for a centralized authorization and/or payment system is provided for herein. When a user desires to utilize a mobility service, user information pertaining to the user (e.g., acquired from a mobile device associated with the user) and vehicle information pertaining to a vehicle the user is occupying (e.g., acquired from the vehicle) may be transmitted to an authorization system configured to authorize the mobility service and/or to debit an account associated with the user and/or vehicle (e.g., if a fee is associated with using the mobility service).

As an example, consider the scenario where a commercial vehicle that is part of a fleet requires refueling. When a user of the vehicle enters the vehicle, the vehicle may communicate with a mobile device associated with the user, such as the user's mobile telephone, a key fob, electronic chip, etc., to determine the identity of the user and/or to gather other user information. Subsequently, when the vehicle approaches a refueling station, the vehicle may communicate vehicle information (such as a vehicle identification number) and user information to the refueling station. The refueling station may then contact an authorization and/or payment system (e.g., which may be a component of an overall system configured to authorize one or more actions as provided herein) to determine whether that particular user is permitted to refuel that particular vehicle based upon the supplied vehicle and user information. If the user/vehicle combination is authorized, the authorization system may provide authorization to the refueling station and may debit the cost of the fuel to a fleet operator. In this way, the fleet operator can monitor cost by restricting which users can refuel which vehicles. By way of example, the user could not refuel his/her personal vehicle and charge it to the fleet operator because the authorization is based upon both vehicle information and user information.

The example systems and/or techniques could be applied to a host of mobility services and/or vehicle-centric actions (e.g., which may also be referred to as transactions as "action" and/or the like and "transaction" and/or the like may be used herein interchangeably). For example, such an authorization/payment system could be utilized for vehicle refueling transactions (e.g., which may include refueling the vehicle with gas, hydrogen, electrical, or other power sources), parking transactions, toll road transactions, congestion zone transactions, and/or other vehicle related transactions (e.g., such as the authorization/purchase of in-car navigational services, entertainment services, vehicle ferry fees, etc.).

FIG. 1 illustrates an example environment 100 intended to provide an overview of how the techniques and/or systems described herein may be utilized. More specifically, FIG. 1 illustrates an example vehicle 102 that has approached a parking gate 104 and is attempting to gain entry into a secured/restricted area (e.g., a parking garage, parking lot, etc.).

In the example environment 100, the vehicle 102 is configured to communicate information 110 about the vehicle and about an occupant of the vehicle (e.g., a user occupying the vehicle) to the parking gate 104 via a first communication network (not shown) in an attempt to gain entry. By way of example, in the illustrated embodiment, the vehicle 102 communicates a vehicle identification number (e.g., VIN) and a username of the occupant to the parking gate 104.

The parking gate 104 may be configured to communicate with an authorization system 108 via a second communication network 106 to acquire authorization to open the gate (e.g., or perform some other action) (e.g., where the authorization system 108 may be a component of an overall system configured to authorize one or more actions as provided herein). By way of example, in the illustrated environment 100, the parking gate 104 is configured to supplement the information 110 provided by the vehicle 102 with information pertaining to the parking establishment and/or to transmit the supplemented information 112 to the authorization system 108. In the example environment 100, the supplemented information 112 may comprise, among other things, the information 110 provided by the vehicle 102 as well as a fee that the parking establishment charges for entry and a parking establishment identification number configured to identify the parking establishment and/or parking gate 104 to the authorization system 108. Although, in other embodiments, other and/or additional information may be supplemented by the parking gate 104.

The first communication network (not shown) and the second communication network 106 may utilize any suitable data communication, telecommunication, wireless, wired/cabled, and/or other technology. In practical deployments, the first and/or second communication networks 106 may utilize any number of communication links. For example, the first and/or second communication networks may include or be realized as a LAN, WAN, a WLAN, Internet, cellular service network, paging service network, PBX, and/or the like. Moreover, the first and/or second communication networks may include a communication link, which may be a wired link, a wireless link, or a link that combines wired and wireless technologies. Typically, where the vehicle 102 is configured to communicate with the parking gate 104, such communication may comprise at least some wireless aspects (e.g., to avoid requiring the vehicle 102 to provide a physical or cable link between the vehicle 102 and the parking gate 104). By way of example, the vehicle 102 may utilize a Bluetooth, Wi-Fi, or Infrared communication link to wirelessly communicate information between the vehicle 102 and the parking gate 104. Moreover, as will be further described in more detail below, the vehicle and/or a mobile device associated with the user (not shown) may communicate directly with the authorization system 108 (e.g., as opposed to communicating through the intermediate parking gate 104). As such, a first communication network between the vehicle and the parking gate 104 may not be necessary in at least some embodiments, for example. Further, a vehicle may be identified to a mechanism configured to perform the action (e.g., such as a gate) via an infrared transceiver (e.g., transmitter and/or receiver), via a radio frequency identification device, via a bar code (e.g., displayed via a mobile app.), via a QR code, and/or any other manner of conveying identification information between the mobile device and the vehicle and/or between the vehicle and/or the mobile device and the mechanism configured to perform the action, for example.

The authorization system 108 is configured to determine whether the vehicle/user combination is authorized to enter the parking establishment based upon the information supplied by the parking gate 104. By way of example, the user or an entity associated with the user (e.g., such as the user's employer) may have previously created a user account accessible by the authorization system 108. The user account may comprise, among other things, information pertaining to what types of actions are authorized for what user/vehicle combinations. Moreover, the user and/or the entity associated with the user may have associated a debit account (e.g., such as a credit card account) with the user account. In this way, fees and/or charges incurred by the user/vehicle combination for mobility services may be debited from the debit account and/or credited to an account associated with the parking establishment, for example.

As an example, in the illustrated environment 100, the authorization system 108 may receive the supplemented information 112 supplied by the parking gate 104 and may determine whether to authorize the action (e.g., authorizing the parking gate 104 to open and/or permitting the vehicle 102 to enter the secured/restricted area). For example, using the user identification (e.g., "John123"), the authorization system 108 may retrieve the user account and determine whether to authorize the action. This determination may include, among other things, determining whether the user account authorizes this particular vehicle/user combination to park in this parking establishment, determining if the user has authorized this particular vehicle/user combination to incur a $10 fee for parking in this parking establishment, etc. Moreover, if the authorization system 108 determines that the user/vehicle combination is authorized, the authorization system 108 may attempt to debit the debit account associated with the user's account. If the debit transaction is accepted, the authorization system 108 may authorize the action (e.g., opening the gate) and notify the gate 104 of this authorization (e.g., including notice of the successful payment transaction). By way of example, in the illustrated environment 100, the authorization system 108 is configured to provide information 114 to the parking gate 104 notifying the parking gate that authorization has been approved and providing the parking gate 104 with a transaction identification or authorization code (e.g., so that the transaction/authorization can be later reviewed). Upon authorization, the parking gate 104 may open to allow the vehicle 102 to enter the parking establishment.

It may be appreciated that the example environment 100 is merely intended to provide an overview of the one or more systems and/or techniques provided herein. That is, additional details may be apparent in view of the following description and/or alternative arrangements may be described below that are not mentioned with respect to the example environment 100. For example, in another embodiment, the vehicle 102 may communicate with the authorization system 108. Further, details regarding how user information may be communicated to the vehicle 102 may be described below.

Figure 2:
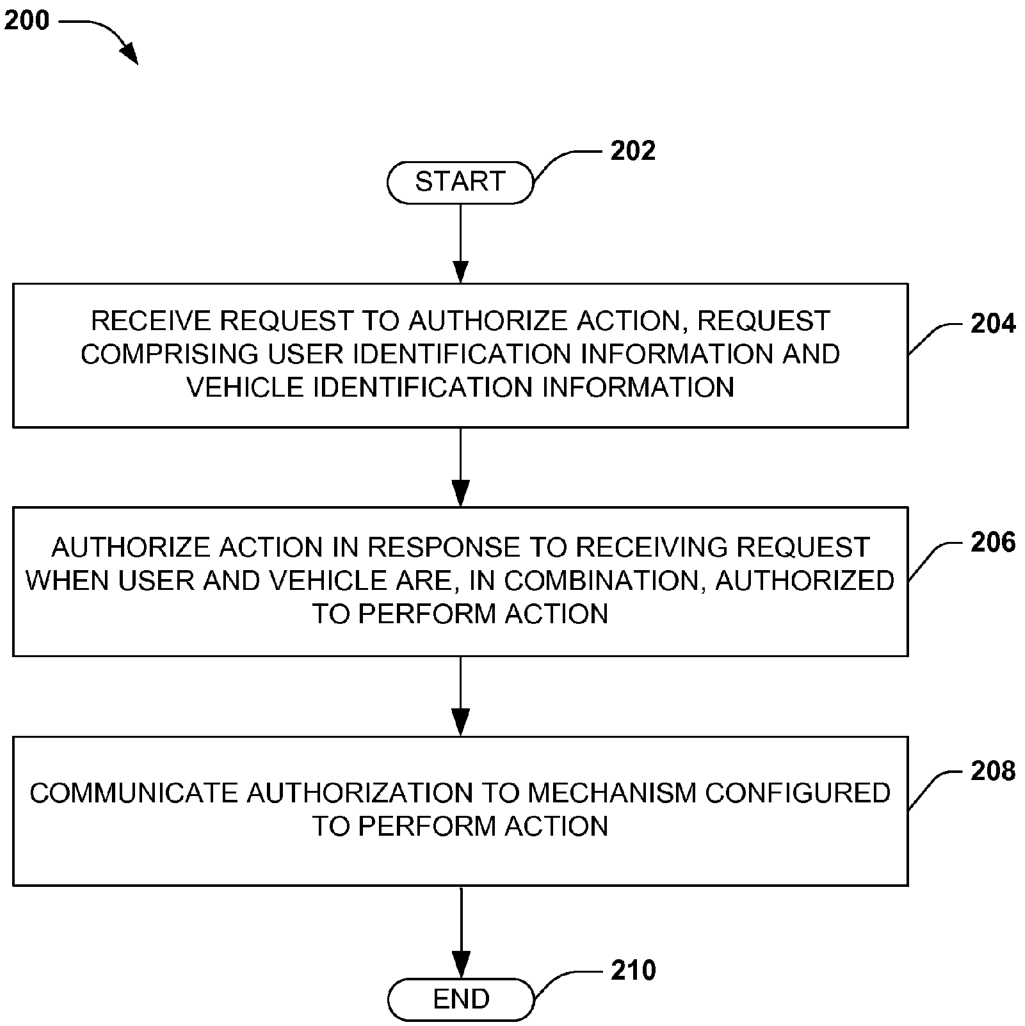
FIG. 2 illustrates an example flow diagram of an example authorization method.

FIG. 2 illustrates an example authorization method 200 that may be utilized by an authorization system (e.g., 108 in FIG. 1), for example, to authorize an action. Such actions typically relate to vehicle-centric mobility services, although the example method 200 may find applicability with other services and/or payment systems. By way of example, the action may relate to, but is not limited to, refueling a vehicle (e.g., 102 in FIG. 1), parking the vehicle, accessing an area to which vehicle-access is restricted, paying a vehicle ferry/transport fee, and/or utilizing a fee-based road segment (e.g., such as a toll road, toll bridge, congestion zone, etc.). It may be appreciated that as described herein, refueling a vehicle is intended to be defined broadly to include supplying the vehicle with a power source, which may include, electric energy, gasoline, diesel fuel, hydrogen, and/or other sources from which power may be extracted, for example. Other vehicle-centric mobility services that are contemplated include in-vehicle services such as data services, entertainment services, car-wash services, navigational services, and/or other services that may be provided to a user via the vehicle, for example.

The example method 200 begins at 202, and a request to authorize an action is received at 204. The request typically comprises, among other things, vehicle identification information pertaining to the vehicle and user identification information pertaining to a user occupying the vehicle. The vehicle identification information may comprise, among other things, a vehicle identification number (VIN), a license plate number, or other (unique) information from which to identify the vehicle. The user identification information may comprise, among other things, a username and/or password for a user account, an employee identification number, a license number, and/or other (unique) information from which a user may be identified.

As will be further described in more detail below, the request may be received from any of a plurality of sources. By way of example, as illustrated in FIG. 1, the request for authorization may be generated and/or communicated (e.g., to the authorization system) by a mechanism configured to perform the action (e.g., such as a parking gate, refueling platform, a parking meter, a toll road authority, a congestion zone authority, etc.). In other embodiments, the request may be generated and/or communicated by the vehicle and/or by a mobile device associated with the user (e.g., without being sent to the mechanism configured to perform the action). These later embodiments may be more advantageous where the user identification information and/or vehicle identification information that is communicated includes passwords and/or other sensitive information that the user desires to remain secure and/or private, for example. As an example, a parking gate (e.g., 104 in FIG. 1) or other mechanism configured to perform the action may communicate, to the vehicle, a unique identifier of the mechanism. The vehicle may, in-turn, communicate the user identification information, vehicle identification information, and unique identifier of the mechanism to an authorization system via the request. In this way, the authorization system may be provided with information sufficient to determine the action to which the request pertains and user/vehicle identification information from which to determine whether to authorize the request, for example.

The method 200 further comprises, at 206, authorizing the action in response to receiving the request when the user, as identified by the user identification information, and the vehicle, as identified by the vehicle identification information, are, in combination, authorized to perform the requested action. That is, the action may be authorized when the user is authorized to perform the action while occupying the particular vehicle that the user is occupying and/or when the vehicle is authorized to perform the action while being occupied by the particular user. Further, as may be described below, authorization of user/vehicle combinations may be defined by a user and/or an entity associated with the user via an authorization interface (e.g., 600 in FIG. 6) of the authorization system. Using such an authorization interface, the user may specify which actions are permitted to be performed by which user/vehicle combinations and/or may specify limitations for performing particular actions. For example, the user may specify that a refueling mechanism may charge up to $40 to the account when a particular user/vehicle combination is requesting fuel and/or may specify a grade of fuel that the refueling mechanism is required to use when refueling a particular vehicle. Moreover, it may be appreciated that via such an authorization interface, a user may be authorized for an action in any vehicle, and thus the vehicle identification information may not be pertinent to the authorization. Likewise, a vehicle may be authorized for an action regardless of the particular user occupying the vehicle, and thus the provided user identification information may not be pertinent to determining authorization (e.g., although the user identification information may be recorded for record keeping purposes).

If the user is not authorized to perform the action while occupying the particular vehicle that the user is occupying (e.g., and is instead merely authorized when occupying other vehicles) and/or if the vehicle is merely authorized when other users are occupying the vehicle, the authorization may be denied. In one embodiment, such a denial may be communicated to the device making the request and/or to another device (e.g., associated with the request). For example, where the vehicle is making the request, a notice denying the request may be communicated back to the vehicle (e.g., and displayed on a monitor to the user). In another embodiment, the mechanism configured to perform the action may have communicated the request to the authorization system, for example, and the notice denying the request may be communicated to the vehicle and/or the mobile device (e.g., as opposed to being transmitted back to the mechanism that communicated the request). Moreover, where an action is denied, the communicated denial may include alternative actions to be performed in view of the denial. For example, if the vehicle/user combination is denied entry to a parking establishment, the denial may comprise suggestions to nearby parking establishments and/or different parking levels that the vehicle/user combination is authorized to utilize and/or may suggest that the user pay by cash. Further, the denial may comprise an option for the user to add the vehicle to his/her user account (e.g., from which authorization is determined) and/or to override the denial (e.g., so that the action can be performed despite the initial denial). In such an embodiment, the denial may also request that the user enter authentication credentials to verify that the user has access rights to edit the account and/or override the denial.

The method 200 further comprises communicating the authorization to the mechanism configured to perform the action (e.g., the refueling mechanism, parking gate, etc.) at 208. By way of example, an authorization system may communicate the authorization directly to the mechanism and/or the authorization may be communicated to the mechanism via an intermediary, such as through the vehicle and/or mobile device (e.g., via a Bluetooth, Wi-Fi, or other link established between the mechanism and the vehicle and/or mobile device). Further, in one embodiment, the authorization may be logged to an account associated with the user and/or an entity associated with the user (e.g., such as an employer of the user). In this way, the user and/or the entity may review a history of authorizations and/or may review locations where actions were performed, for example.

Upon receipt of the authorization, the mechanism configured to perform the action may proceed to perform the action as authorized by the communicated authorization. For example, a fueling platform may proceed to dispense fuel, an authorized number of minutes may be applied to a parking meter, a parking gate may open, a toll gate may open, and/or a congestion zone gate may open. As another example, where the action pertains to an in-vehicle mobility service, such as a navigation service or entertainment service, the service may be initiated based upon receipt of the authorization (e.g., to provide for streaming a movie to passengers of the vehicle and/or assisting with navigation).

It may be appreciated that in some embodiments, as part of the authorization, a fee or cost associated with the mobility service may be debited to the user account and/or to a debit account (e.g., a credit card account or other electronic funds account) associated with the user account and/or a provisional fee may be applied to the user account (e.g., where an exact amount of the fee may be unknown until the action is complete such as in situations where parking establishments charge by the hour and/or such as may occur during refueling). By way of example, in one embodiment, upon receipt of the request to authorize the action, an authorization system may access payment information associated with the user account (e.g., or user) based upon the user identification information and initiate a payment transaction associated with the action. As an example, if a parking entity charges a ten dollar fee for parking, the authorization system may initiate a payment transaction for ten dollars (e.g., debiting ten dollars from the debit account) prior to authorizing the transaction.

It may also be appreciated that while such a payment may be initiated prior to approving the authorization (e.g., to verify that the requisite funds are available), the payment transaction may not be completed and/or the funds may not be transferred until the action has been authorized. For example, where the action relates to refueling the vehicle, the payment transaction may be initiated prior to authorizing the refueling platform to dispense fuel. However, the transaction may not be completed until after the authorization has occurred because it may not be known how much fuel is required (e.g., and thus dispensed) until the authorization has occurred and fuel is dispensed. As another example, a parking establishment may charge on an hourly basis. Thus, the fee that is debited to the user account may be a function of the number of hours the vehicle remains parked in the parking establishment. As such, when the vehicle enters the parking establishment, a time of entry may be recorded (e.g., as part of the authorization). When the vehicle exits the parking establishment, the amount of time spent in the parking establishment may be calculated and a corresponding fee may be debited to the user account. Therefore, while an initial authorization may be computed upon entry to the parking establishment, the fee may not be debited until much later. In such an embodiment, the mechanism configured to perform the action (e.g., the parking gate/establishment, the refueling platform, etc.), for example, may further communicate with the authorization system upon completion to provide the authorization system with an exact amount of the fee to debit a debit account. By way of example, during an initial authorization, a refueling platform may receive an authorization ID. When the user is finished refueling the vehicle, the refueling platform may communicate the authorization ID and final fee amount to the authorization system so that the debit account associated with the user and/or vehicle may be debited appropriately.

Moreover, it may be appreciated that the user account may be associated with the vehicle as opposed to the user and the payment information may be associated with the vehicle. As an example, in a corporate environment, the company may establish one user account for a fleet of vehicles. In such an embodiment, it may be desirable to identify the user account based upon the vehicle identification information (e.g., which may be more static than user identification information if turnover of employees is high) and/or payment information linked to the account may be payment information associated with the company as opposed to a user/operator of the vehicle.

In some embodiments, a status of the authorization may be provided to the user via an in-vehicle alert system, via the mobile device, and/or via the mechanism configured to perform the action. As an example, as part of the authorization, the authorization system may communicate with the mobile device and/or vehicle, requesting that the user acknowledge the transaction (e.g., where the user may acknowledge the transaction by selecting an acceptance key on a mobile device and/or in-vehicle display). Such an acknowledgement may serve as a security measure to verify that user information and/or vehicle information has not been stolen.

As another example, in some embodiments, an initial authorization may provide for authorizing the action for a specified period of time, and the provided status may include an alert notifying the user when the specified period of time is within a predetermined time of lapsing (e.g., which may include notifying the user after the specified period has lapsed). As an example, the initial authorization may relate to authorizing a vehicle to park at a parking meter for thirty minutes and thirty minutes may be applied to the parking meter. When the thirty minutes are about to expire, the authorization system and/or vehicle, for example, may communicate to the user (e.g., via the mobile device) the impeding time lapse. Further, in one embodiment, such an alert may provide the user with an option to extend the specified period of time. Thus, the user may add minutes to the parking meter if the user believes s/he may not be able to return to the vehicle within the initially authorized thirty minute time period. If the user selects to extend the specified period of time, a request to extend the time on the meter may be transmitted to the parking meter and/or to the vehicle (e.g., which may, in-turn, communicate the request to the parking meter).

Figure 3:
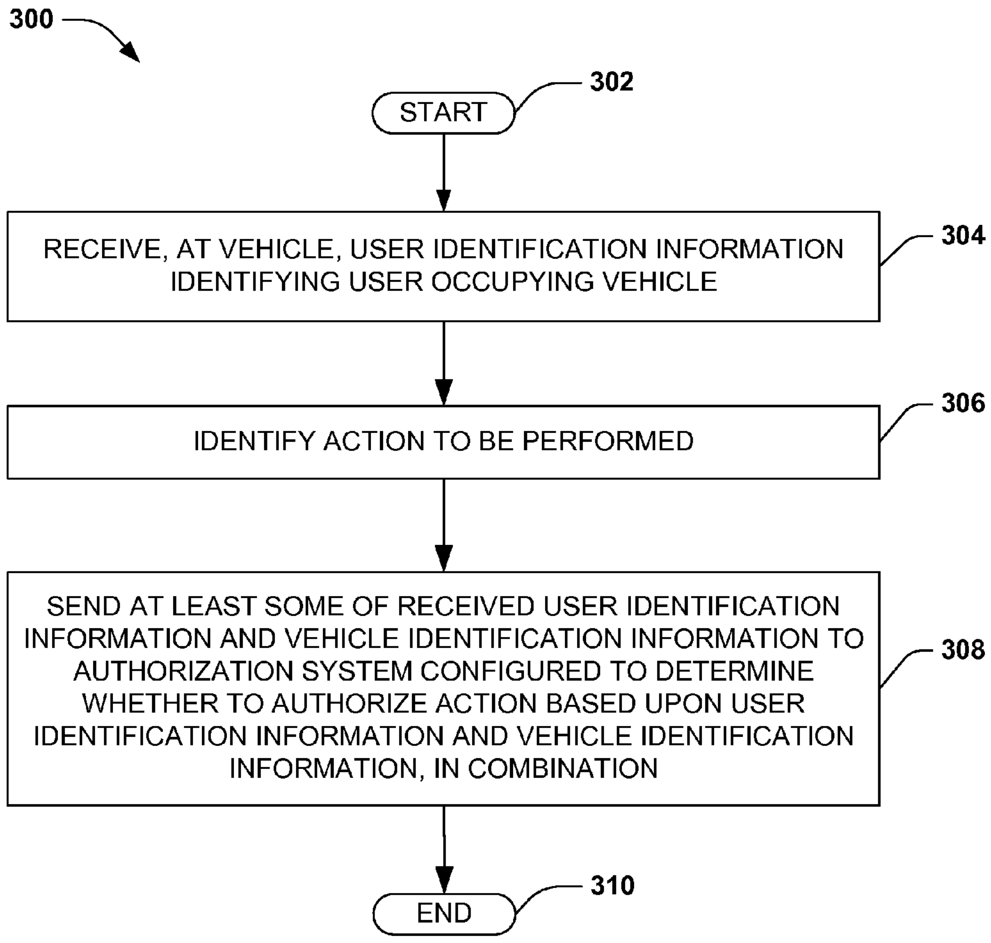
FIG. 3 illustrates an example flow diagram of an example authorization method.
Figure 4:
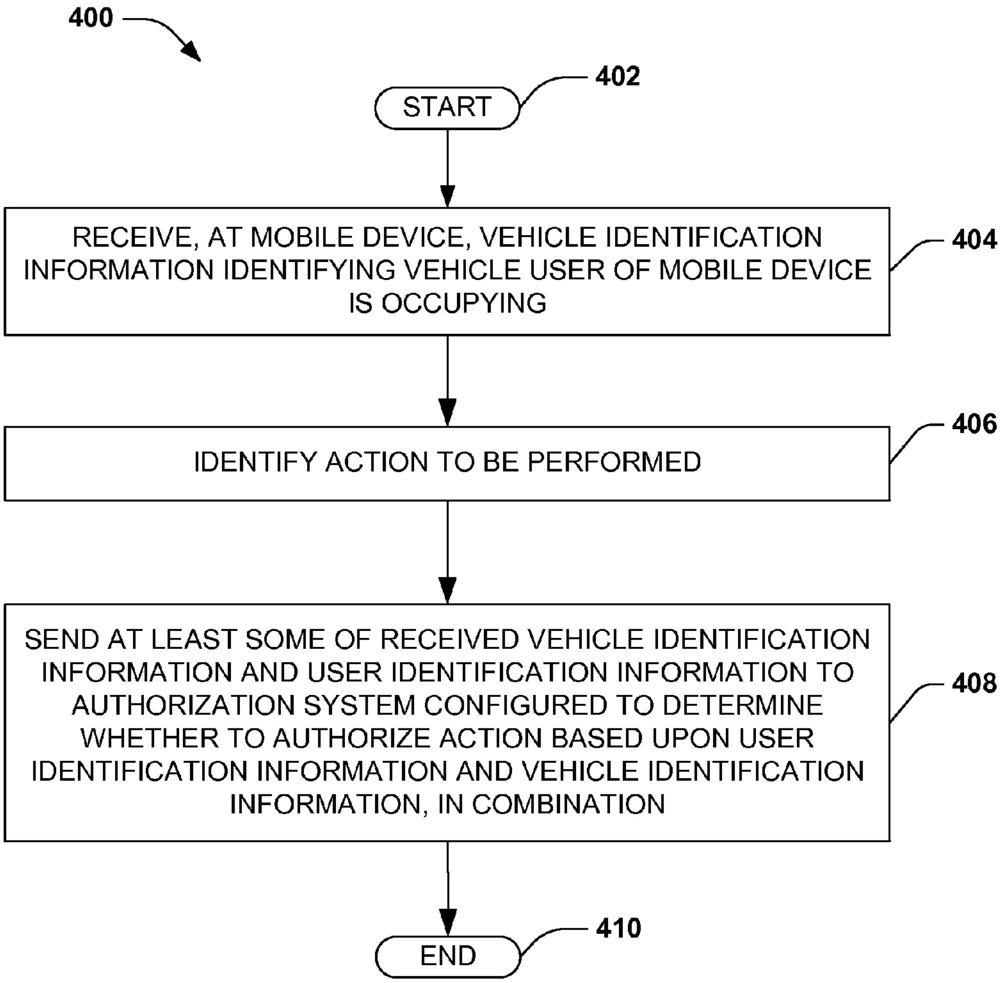
FIG. 4 illustrates an example flow diagram of an example authorization method.

As described above, there are numerous configurations and/or techniques for communicating user identification information and/or vehicle identification information to the authorization system. FIGS. 3-4 illustrate two example authorization methods 300 and 400 for communicating the user identification information and vehicle identification information (e.g., the request) to the authorization system. It may be appreciated that the current/instant disclosure, including the scope of the claims, is not intended to be limited as such to the extent practical, as numerous other techniques for communicating such information is also contemplated.

In FIG. 3 the example authorization method 300 (e.g., which may be referred to as a vehicle-centric authorization method) begins at 302, and user identification information identifying a user occupying the vehicle is received at the vehicle at 304. As previously stated, the user identification information may include, among other things, a user account number, a username and/or password, employee identification, a license number, and/or other (unique) information from which a user can be identified by the authorization system.

To acquire the user identification information, the vehicle may be in operable contact with a mobile device associated with the user. By way of example, when a user and his/her mobile device enter the vehicle, the vehicle and the mobile device may establish a communication link from which user identification information may be transmitted from the mobile device to the vehicle. As an example, a user's mobile telephone and the vehicle may comprise Bluetooth or other wireless capabilities. When the mobile telephone is within a specified spatial proximity of the vehicle, the vehicle may detect the mobile device and detect user identification information associated with the mobile device. In another example, the mobile device may comprise, among other things, a key fob, electronic key, a near-field communication chip, an RFID chip, or other electronic device from which it can be determined, by the vehicle, who is occupying the vehicle. Thus, the vehicle may be configured to detect such key fobs, electronic keys, etc. and to identify user identification information associated with the detected key fob, electronic key, etc. As an example, the vehicle may be preprogrammed such that first user identification information is associated with a first key fob and second user identification information is associated with a second key fob. When the first key fob is detected, first user identification information (e.g., stored in memory in the vehicle) may be retrieved. In such an embodiment, receiving, at the vehicle, user identification information may comprise detecting a key fob and retrieving user identification information stored in memory of the vehicle. In other embodiment, as least some of the user identification information (e.g., such as a username) may be transmitted from the mobile device to the vehicle and other user identification information (e.g., such as a password) may be stored in memory on the vehicle (e.g., so that the password is not transmitted wirelessly (e.g., such as through an unsecure medium)). In one embodiment, the user identification information is merely temporarily stored while the user is occupying the vehicle. Thus, when the user exits the vehicle and/or when an intention to disembark the vehicle is received (e.g., such as by locking the vehicle), the user identification information may be automatically erased from the vehicle. In another embodiment, the user identification information may be stored even when the user is not occupying the vehicle, although it may be merely supplied to an authentication system when the user is occupying the vehicle, for example.

At 306 in the example method 300, an action to be performed is identified. It may be appreciated that for the sake of simplicity and brevity, reference may be made to FIG. 2 to describe what type(s) of actions may be identified.

In one embodiment, identifying the action may comprise identifying, at the vehicle, the action to be performed. By way of example, as the vehicle approaches a mechanism configured to perform the action (e.g., a parking gate, refueling station, etc.), the vehicle may communicate with the mechanism to identify an action to be performed and/or to collect identification information from the mechanism. As an example, the vehicle may communicate with the mechanism via a wireless communication protocol (e.g., Bluetooth, Wi-Fi, etc.) to receive identification information from the mechanism which may be useful and/or necessary for an authorization system to determine whether to authorize the particular action that is requested. In another embodiment, identifying the action to be performed may comprise a user specifying the action to be performed. For example, the user may enter, into an in-vehicle system, a request to open a gate at 6505 May Street in Seattle, Wash. Thus, in this embodiment, the action to be performed is identified at least partially based upon user input.

At 308 in the example method 300, at least some of the received user identification information and vehicle identification information are sent to an authorization system configured to determine whether to authorize the action based upon the user identification information and the vehicle identification information, in combination. That is, as illustrated in FIG. 1, the vehicle identification information and the user identification information are transmitted to the authorization system to determine whether the user/vehicle combination are authorized for the action that is being requested.

In the example method 300, where the user identification information is received at the vehicle, it may be desirable for the vehicle to send the user identification information and the vehicle identification information to the authorization system (e.g., provided the vehicle comprises sufficient communication capabilities for communicating such information to the authorization system). In other embodiments, such information may be transmitted to the mobile device and/or the mechanism configured to perform the action, for example, and the mobile device and/or the mechanism configured to perform the action may be configured to relay the information to the authorization system.

In one embodiment, such as where the vehicle is configured to request the authorization by sending the user identification information and/or the vehicle identification information to the authorization system, the method 300 may further comprise communicating, to the vehicle, authorization information authorizing the action to be performed. The vehicle may, in-turn, be configured to transmit the authorization information to the mechanism configured to perform the action, for example. In this way, the communication for acquiring authorization remains between the vehicle and authorization system, for example, with the mechanism configured to perform the action merely receiving a notice that the authorization has been approved (e.g., and the user account has been debited a specified sum of money for the action).

The example method 300 ends at 310.

FIG. 4 illustrates another example authorization method 400 (e.g., which may be referred to as a mobile device-centric authorization method). The method begins at 402 and, at 404 vehicle identification information identifying a vehicle the user is occupying is received at the mobile device. As previously stated, the vehicle identification information may include, among other things, a vehicle identification number, a license plate number, and/or other (unique) information from which a vehicle can be identified by an authorization system.

To acquire the vehicle identification information, the mobile device may be in operable contact with the vehicle. By way of example, when a user and his/her mobile device enter the vehicle, the vehicle and the mobile device may establish a communication link from which vehicle identification information may be transmitted from the vehicle to the mobile device. As an example, a user's mobile telephone and the vehicle may comprise Bluetooth or other wireless capabilities and when the mobile telephone is within a specified spatial proximity of the vehicle, the mobile device may detect the vehicle and detect vehicle identification information associated with the mobile device. In another example, the vehicle may comprise, among other things, a near-field communication chip, an RFID chip, and/or other electronic device from which vehicle identification information can be determined by the mobile device. Thus, the mobile device may be configured to detect such chips and to identify vehicle identification information associated with the detected chip. As an example, the mobile device may be preprogrammed such that first vehicle identification information is associated with a first electronic chip and second vehicle identification information is associated with a second electronic chip. When the first electronic chip is detected, first vehicle identification information (e.g., stored in memory in the mobile device) may be retrieved. In such an embodiment, receiving, at the mobile device, vehicle identification information may comprise detecting an electronic chip comprised within the vehicle and retrieving vehicle identification information stored in memory of the mobile device. In other embodiments, at least some of the vehicle identification information may be transmitted from the vehicle to the mobile device and other vehicle identification may be stored in memory on the mobile device.

At 406 in the example method 400, an action to be performed is identified. It may be appreciated that for the sake of simplicity and brevity, reference may be made to FIG. 2 to describe what type(s) of actions may be identified.

In one embodiment, identifying the action to be performed may comprise identifying, at the mobile device, the action to be performed (e.g., whereas FIG. 3 described this relative to the vehicle). By way of example, as the vehicle and mobile device approach a mechanism configured to perform the action (e.g., a parking gate, refueling platform, etc.), the mobile device may communicate with the mechanism to identify an action to be performed and/or to collect identification information from the mechanism. As an example, the mobile device may communicate via a wireless communication protocol (e.g., Bluetooth, Wi-Fi, etc.) to receive identification information from the mechanism which may be useful and/or necessary for an authorization system to determine whether to authorize the particular action that is requested. In another embodiment, identifying the action to be performed may comprise a user specifying the action to be performed. For example, the user may enter into the mobile device a request to open a gate at 6505 May Street in Seattle, Wash. Thus, in this embodiment, the action to be performed is identified at least partially based upon user input.

At 408 in the example method 400, at least some of the received user identification information and vehicle identification information are sent to an authorization system configured to determine whether to authorize the action based upon the user identification information and the vehicle identification information, in combination. That is, as illustrated in FIG. 1, the vehicle identification information and the user identification information are transmitted to the authorization system to determine whether the user/vehicle combination are authorized for the action that is being requested.

In the example method 400, where the vehicle identification information is received at the mobile device, it may be desirable for the mobile device to send the user identification information and the vehicle identification information to the authorization system (e.g., provided the mobile device comprises sufficient communication capabilities for communicating such information to the authorization system). In other embodiments, such information may be transmitted to the vehicle and/or mechanism configured to perform the action, for example, and the vehicle and/or mechanism may be configured to relay the information to the authorization system.

In one embodiment, such as where the mobile device is configured to request the authorization by sending the user identification information and/or the vehicle identification information to the authorization system, the method 400 may further comprise communicating, to the mobile device, authorization information authorizing the action to be performed and the mobile device may be configured to transmit the authorization information to the mechanism configured to perform the action, for example. In this way, the communication for acquiring authorization remains between the mobile device and authorization system, for example, with the mechanism configured to perform the action merely receiving a notice that the authorization has been approved (e.g., and the user account has been debited a specified sum of money for the action).

The example method 400 ends at 410.

Authorization to perform action is communicated to the mechanism configured to perform the action so that the mechanism is aware of the authorization. Such an authorization may be communicated to the mechanism via the authorization system and/or may be communicated to the mechanism via the mobile device and/or vehicle (e.g., where the mobile device and/or vehicle act as an intermediary between the authorization system and the mechanism configured to perform the action).

Figure 5:
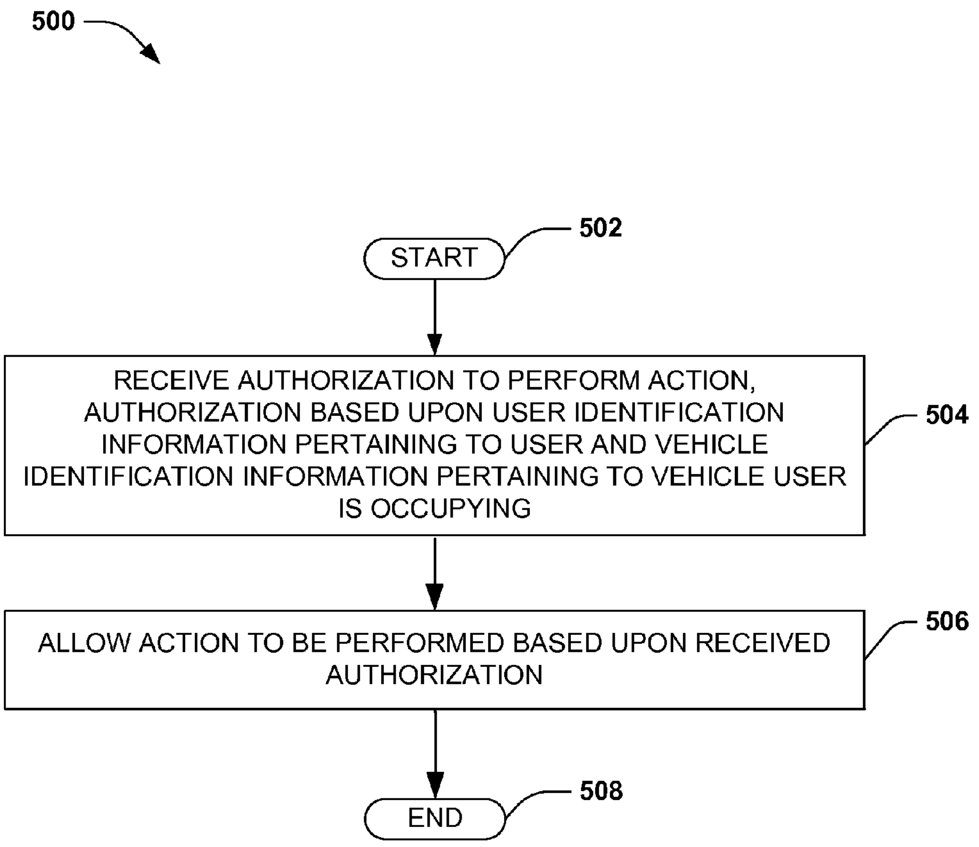
FIG. 5 illustrates an example flow diagram of an example authorization method.

FIG. 5 illustrates an example authorization method 500 (e.g., from the viewpoint of the mechanism configured to perform the action). The method 500 begins at 502 and authorization to perform the action is received at 504. As previously described, the authorization is based upon user identification information pertaining to a user and vehicle identification information pertaining to a vehicle the user is occupying.

The authorization may result from a request for authorization transmitted to an authorization system by the mechanism configured to perform the action, the vehicle, and/or the mobile device, for example. As an example, in one embodiment, user identification information and vehicle identification information may be received by the mechanism configured to perform the action (e.g., from the mobile device, the vehicle, and/or a combination of the mobile device and vehicle). The mechanism may be configured to forward/send at least some of the received information (e.g., along with information pertaining to/identifying the mechanism) to the authorization system, and the authorization system may be configured to authorize or not authorize the action based upon the information received from the mechanism. It may be appreciated that while specific reference is made to the mechanism transmitting the request to the authorization system and receiving the authorization from the authorization system, it may be appreciated that, as described in previous embodiments, the request may be transmitted by the vehicle and/or by the mobile device and the authorization may be transmitted to the mechanism via the vehicle and/or via the mobile device.

At 506 in the example method 500, the action is allowed to be performed when the authorization is received. That is, the mechanism performs the action according to the authorization. By way of example, a refueling station may dispense fuel, a parking gate may open to allow the vehicle to enter and/or exit a parking establishment, a toll gate may open to allow the vehicle to enter and/or exit, and/or an authorized number of minutes may be added to a parking meter. Thus, upon receipt of the authorization (e.g., and payment) from the authorization system, the mechanism configured to perform the action may proceed to perform the action as specified/restricted by the authorization system (e.g., where the authorization may include restrictions for the action such as by specifying a number of minutes/hours the action may be allowed to occur).

The example method 500 ends at 508.

As previously described, prior to requesting authentication and/or requesting an action to be performed, a user, an employer, etc. may be required to create a user account with the authorization system. Such an account may specify, among other things, what user/vehicle combinations are permitted to utilize what mobility services and may include a debit account to be charged when an action is requested for the user/vehicle combination.

Figure 6:
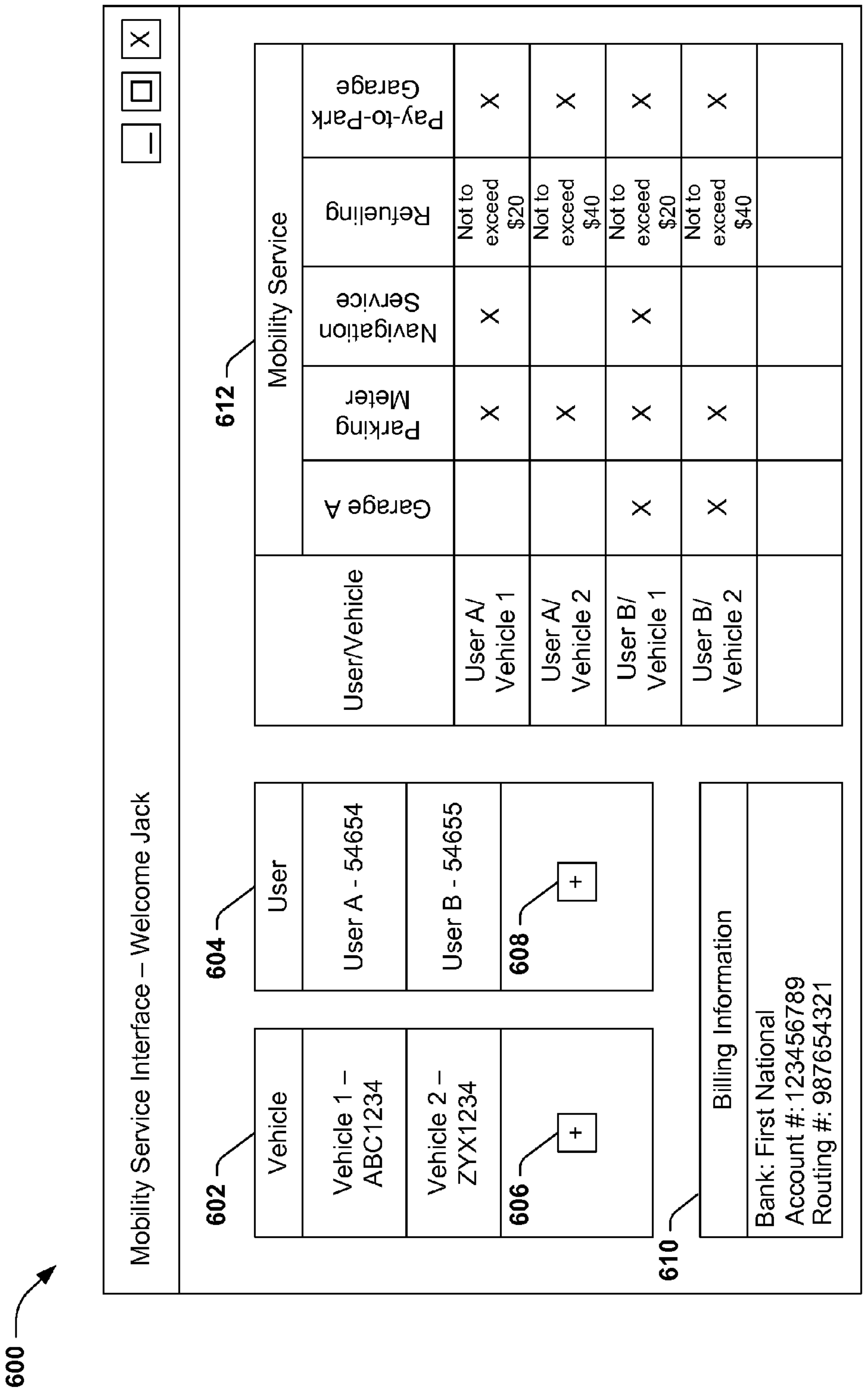
FIG. 6 is an exemplary graphical interface for modifying a user account utilized to authorize a service.

FIG. 6 illustrates an example graphical interface 600 that may be displayed to a user/employer/etc. to assist the user/employer/etc. in creating and/or updating the user account. It may be appreciated that while the example graphical interface 600 merely describes two users and two vehicles, such an interface 600 may be scalable to include more users and/or more vehicles and/or may be scalable to include fewer users and/or fewer vehicles. Moreover, it may be appreciated that the example graphical interface 600 merely illustrates some of the many features that may be included in a graphical interface and provides for merely some of the many options a user may be able to configure with respect to the user account. Thus, the example graphical interface 600 is not intended to limit the scope of the instant disclosure, including the scope of the claims.

The example graphical interface 600 comprises a vehicle column 602 and a user column 604 configured to list the vehicles and users, respectively, associated with the user account. As an example, the vehicle column 602 lists vehicles 1 and 2. A user with authorized access to the account may add additional vehicles by selecting the "+" symbol 606, for example, and/or may delete a vehicle by highlighting the vehicle to be deleted and pressing "delete" on a keyboard or other input device, for example. When an intention to add a vehicle to the list is received a second graphical interface (not shown) may be displayed that request vehicle information about the vehicle to be added. For example, the second graphical interface may request the user enter a vehicle identification number and/or other information unique to the vehicle. In the illustrated embodiment, respective vehicles are identified by a combination of letters and numbers. For example, vehicle 1 may be identified by the combination of "ABC1234." Likewise, vehicle 2 may be identified by the combination of "ZYX1234." Thus, when vehicle identification information is received by the authentication service, vehicle 1 may be identified if the combination of "ABC1234" is included in the vehicle identification information, for example.

A user with authorized access to the account may also add and/or delete users using techniques similar to those described above for adding and/or deleting vehicles. For example, when an intention to add a user to the user list 604 is received (e.g., where the intention may be indicated by the user selecting the "+" symbol 608), a third graphical interface (not shown) may be displayed that request (unique) identification information about the user from which a user can be uniquely identified in user identification information received by an authentication system. For example, in the illustrated graphical representation, user A is identified by the numbers "54654" and user B is identified by the numbers "54655". Thus, if user identification information is received that includes the numbers "54654," the request comprising the user identification information can be correlated to user A.

The example graphical interface 600 further comprises an entry field 610 for billing information. That is, as previously described, one or more debit accounts or other funds may be associated with the user account for billing the user/company/etc. when one or more of the authorized users and/or authorized vehicles utilize a mobility service that includes a fee. For example, in the illustrated interface 600, the user account may be associated with an electronic checking account from which incurred fees may be debited by the authorization system. It may be appreciated that other types of debit accounts, such as credit card accounts, may also and/or instead be linked to the user account.

The example graphical interface 600 further comprises a field 612 for designating which user/vehicle combinations are permitted to utilize which mobility services. For example, in the illustrated embodiment, the user/vehicle combination of User A/Vehicle 1 is authorized to park at parking meters, receive navigation services, refuel the vehicle, and park at pay-to-park garages. It may be appreciated that the combination of User A/Vehicle 1 may also be permitted to utilize other mobility services, such as permitted to park at garage A, but parking fees associated with parking at garage A may not be billed to the user account and/or to an associated debit account, for example. In other embodiments, user A/vehicle A may be unauthorized to park at garage A (e.g., even if an associated fee is not billed to the user account).

As illustrated in the example graphical interface 600 and described above, some mobility services may be authorized for some user/vehicle combinations, but not others. For example, user B is authorized to utilize garage A in both vehicle 1 and vehicle 2 while user A is not permitted to utilize garage A in either vehicle. As another example, users A and B may be permitted to utilize a navigation service when occupying vehicle 1 but may not be authorized to utilize the navigation service when occupying vehicle 2.

It may be appreciated that such authorization may include authorization limits, such as spending limits, time limits, etc. For example, in the illustrated interface 600, user A is not authorized to spend (e.g., bill the account) more than 20 dollars per fuel transaction whereas user B is authorized to spend up to $40. As another example, a user/entity responsible for the user account may impose limitations on the amount a user/vehicle is authorized to spend on parking in a single transaction, a weekly transaction, etc. In this way, the authorization may be customizable to suit the desires/requirements of the user/entity responsible for the user account, for example.

Figure 7:
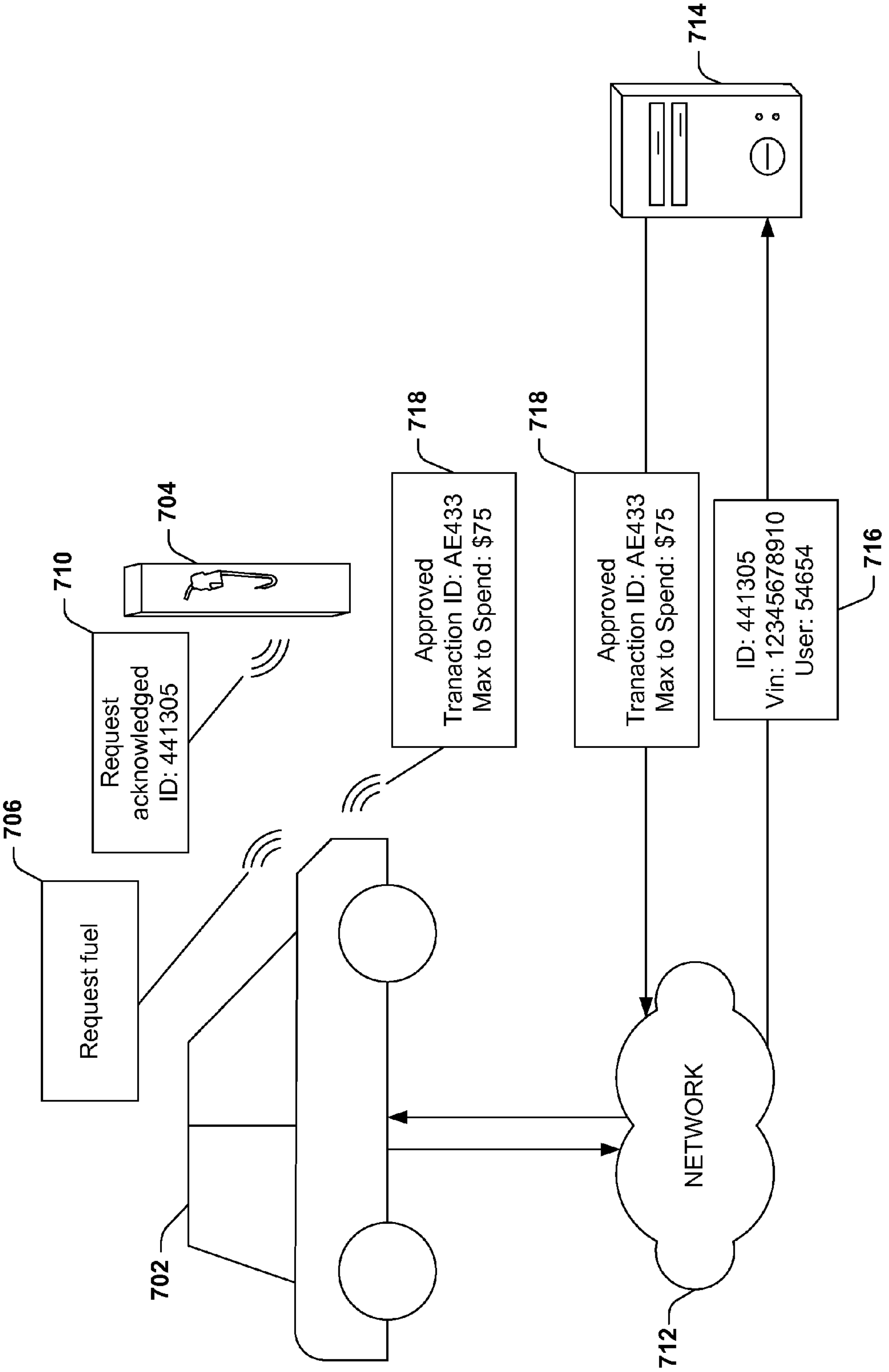
FIG. 7 is an exemplary embodiment for carrying out at least some of the techniques and/or systems described herein.

FIG. 7 illustrates an example embodiment 700 for carrying out one or more of the methods described with respect to FIGS. 2-5. More particularly, FIG. 7 illustrates an example vehicle refueling scenario. As the vehicle 702 is approaching a refueling platform (e.g., gasoline pump, electric supplier, etc.), the vehicle may communicate with the refueling platform. For example, in the illustrated embodiment, the vehicle 702 may request fuel 706 and the refueling platform 704 may respond with an identification tag 708 for the refueling platform 704.

Upon receipt of the request acknowledgement and identification tag 710 (e.g., identifying the refueling platform), the vehicle 702 may communicate with an authorization system 714 via a communication network 712 to request authorization for the action. By way of example, as illustrated in FIG. 7, the request 716 from the vehicle 702 to the authorization system 714 may comprise, among other things, an identification tag 708 of the refueling platform 704, vehicle identification information (e.g., such as a VIN number) and/or user identification information (e.g., such as a username or user number associated with the user).

Upon the authorization system 714 determining that the action is authorized (e.g., based upon the vehicle/user combination (e.g., where authorization for the action to be performed with respect to the vehicle/user combination may be specified in a user account associated with the user and/or vehicle)), an authorization notice 718 may be sent to the vehicle 702 and/or the refueling platform 704. For example, in the illustrated embodiment, the authorization notice 718 is transmitted to the vehicle via the communication network 712. The vehicle may, in-turn, relay the authorization notice 718 to the refueling platform 704, for example.

When refueling the vehicle 702 is complete, the associated refueling fee may be transmitted to the authorization system 714 from the refueling platform and/or the vehicle, and the user account associated with the vehicle/user combination may be debited that corresponding refueling fee.

Although not illustrated, the aforementioned techniques and/or methods may be further applied to other vehicle-centric scenarios where receiving authorization and/or a payment prior to and/or in conjunction with performing a service and/or receiving a good may be useful.

As an example of such a scenario, consider a toll roadway or congestion zone. In such a scenario, toll road pricing and/or congestion zone pricing may be geo-fenced. The vehicle or mobile device may comprise a GPS system or other navigational system that provides for determining whether the vehicle is within a geo-fenced area and/or if the vehicle is approaching a geo-fenced area. When a determination is made that the vehicle is within and/or approaching a geo-fenced area, the vehicle and/or mobile device may communicate with an authority that manages the toll roadway and/or congestion zone and provide time of entry, time of exit, and/or estimated fee. Moreover, a payment transaction may be completed by the authorization system based upon the fee associated with the geo-fenced area, the amount of time spent within the geo-fenced area, and/or the distance the vehicle traveled within the geo-fenced area, for example.

As another example, authorization may comprise authorizing a future action and/or providing a recommendation to a user for alternatives when authorization is denied and/or when alternatives to the requested action are available. By way of example, a user occupying a vehicle may request that the vehicle be routed to a specified venue and the vehicle or mobile device may suggest one or more parking establishments (e.g., or other service providers) that may be within a specified region of the destination for the vehicle. Thus, in such an embodiment, the action that is requested may be a routing action, for example, and in response to the request, the vehicle, mobile device, and/or authorization system may respond by providing a set of service providers that may be useful given the received request. Moreover, in one embodiment, the vehicle and/or authorization system may contact one or more of the service providers (e.g., parking establishments) to determine if the service provider may be of service. For example, the vehicle may contact parking establishments to determine if respective parking establishments have spots available. If a service provider responds positively (e.g., meaning the service provider may be of service), the vehicle and/or mobile device may inform the user of the service provider's response and provide the user with an option of using the service provider. By way of example, if a parking establishment's response indicates one or more spots are available, the vehicle and/or mobile device may provide the user with the option to reserve a spot. If the user selects to reserve a spot, the vehicle and/or mobile device may notify the parking establishment, via the authorization system, of the user's interest in reserving a spot and may initiate a payment transaction. The vehicle and/or user identification information may then be relayed to the garage so that when the vehicle and user arrive at the garage, the vehicle may promptly enter the parking establishment and obtain the reserved spot.

As another example, if the user/vehicle requests an action to be performed by a first parking establishment, for example, the authorization system, vehicle, and/or mobile device may notify the user of other parking establishments, spatially approximate to the user's location, that may be more competitively priced, may have a higher quantity of spots available, and/or may have received better user reviews.

Figure 8:
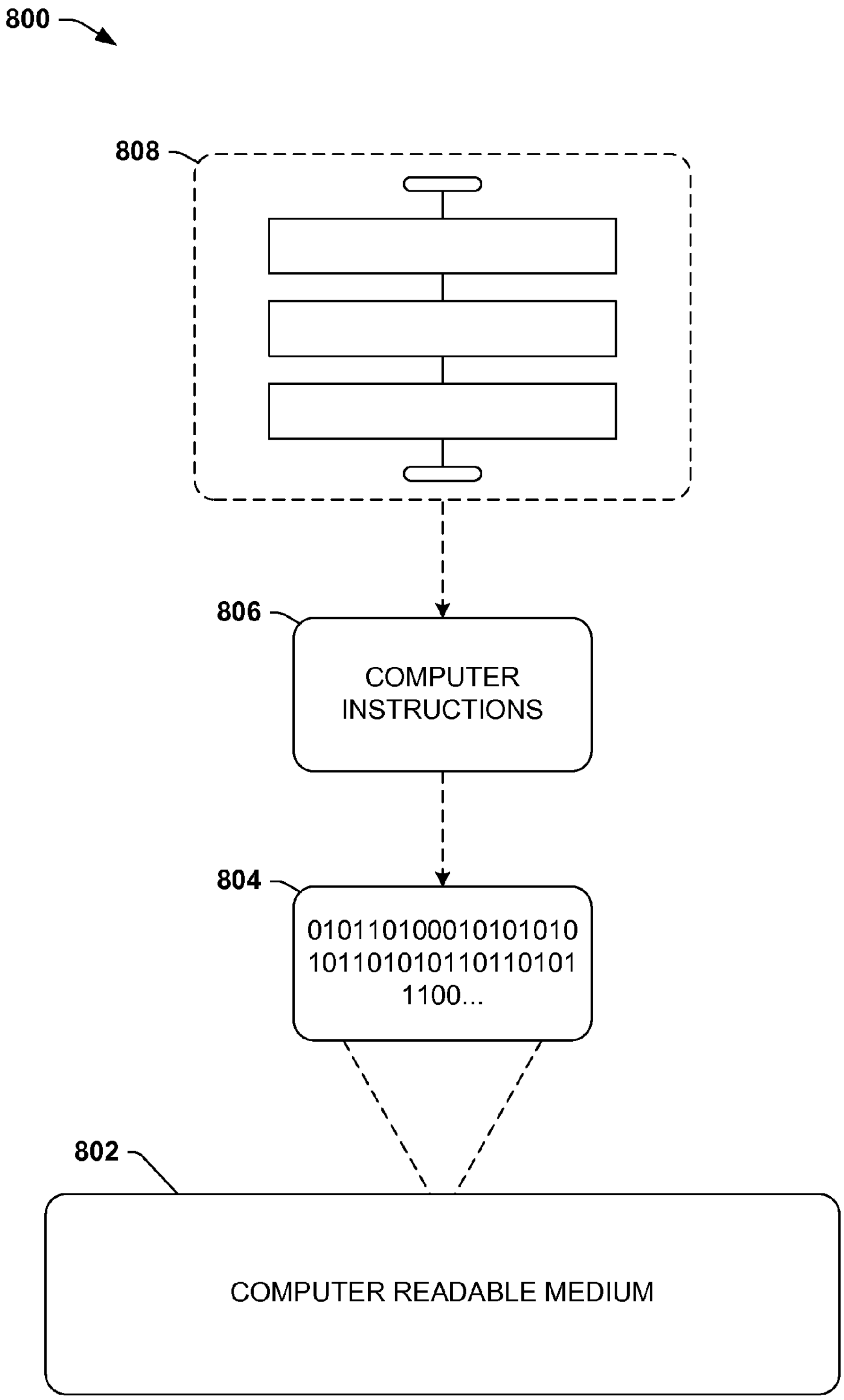
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 804. This computer-readable data 804 in turn comprises a set of computer instructions 806 configured to operate according to one or more of the principles set forth herein. In one such embodiment 800, the processor-executable computer instructions 806 may be configured to perform a method 808, such as at least some of the exemplary method 200 of FIG. 2, at least some of the exemplary method 300 of FIG. 3, at least some of the exemplary method 400 of FIG. 4, and/or at least some of the exemplary method 500 of FIG. 5, for example. In another such embodiment, the processor-executable instructions 1006 may be configured to implement a system, such as at least some of the exemplary system 100 of FIG. 1 and/or at least some of the exemplary system 700 of FIG. 7, for example. Many such computer-readable media 802 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art may recognize many modifications may be made to this configuration without departing from the scope or spirit of the claimed subject matter.

Figure 9:
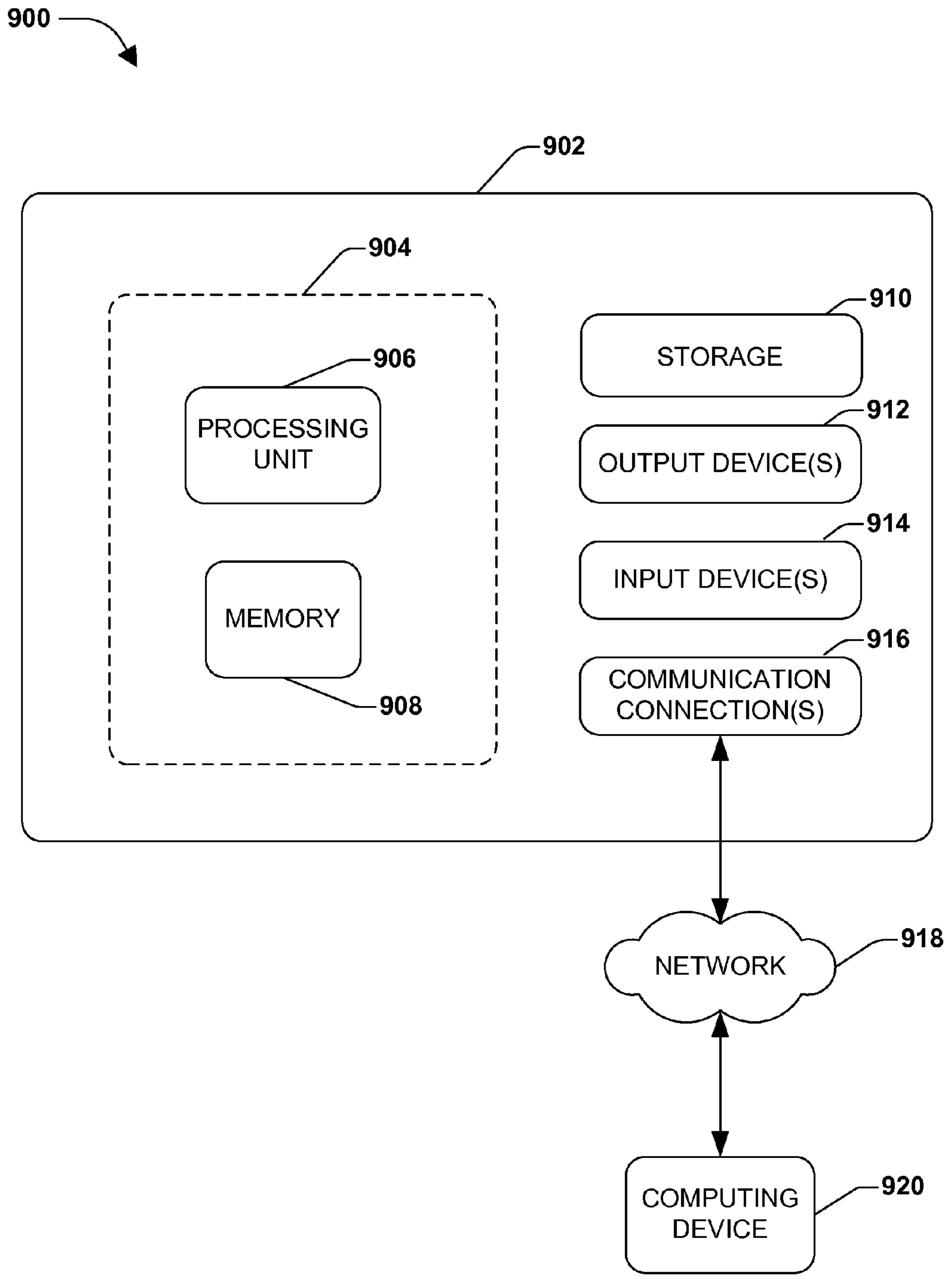
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example), or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art may realize that storage devices utilized to store computer readable instructions may be distributed across a network. For example, a computing device 920 accessible via a network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

Various operations of embodiments are provided herein. In one embodiment, one or more of the operations described may constitute computer readable instructions stored on one or more computer readable media, which if executed by a computing device, may cause the computing device to perform the operations described. The order in which some or all of the operations are described should not be construed as to imply that these operations are necessarily order dependent. Alternative ordering may be appreciated by one skilled in the art having the benefit of this description. Further, it may be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications may occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An authorization method, comprising:

receiving a request to authorize an action, the request comprising:

user identification information pertaining to a user and yielded from a mobile device associated with the user, and vehicle identification information pertaining to a vehicle of the user and yielded from the vehicle; and authorizing the action in response to receiving the request when the user as identified by the user identification information and the vehicle as identified by the vehicle identification information are, in combination, authorized to perform the action.

2. The method of claim 1, the action related to at least one of:

refueling the vehicle;

parking the vehicle;

transporting the vehicle;

accessing a restricted area using the vehicle; or using a fee-based road segment.

3. The method of claim 1, comprising:

accessing payment information associated with the user based upon the user identification information in response to receiving the request; and initiating a payment transaction based upon the payment information in response to authorizing the action.

4. The method of claim 1, comprising:

communicating an authorization generated in response to authorizing the action to a mechanism configured to perform the action.

5. The method of claim 4, the mechanism comprising at least one of:

a fueling mechanism, a parking meter, a parking gate, a toll road provider, or a congestion zone provider.

6. The method of claim 4, communicating the authorization to the mechanism comprising at least one of:

communicating the authorization to the vehicle and the vehicle configured to communicate the authorization to the mechanism, or communicating the authorization to the mobile device and the mobile device configured to communicate the authorization to the mechanism.

7. The method of claim 1, authorizing the action comprising authorizing the action for a specified period of time and the method comprising at least one of:

communicating to the user an alert when the specified period of time is within a predetermined time of lapsing, or providing the user with an option to extend the specified period of time when the specified period of time is within the predetermined time of lapsing.

8. An authorization method, comprising:

receiving, at a vehicle, user identification information identifying a user of the vehicle;

identifying an action to be performed with respect to the vehicle;

sending at least some of the user identification information and vehicle identification information identifying the vehicle to an authorization system configured to determine whether to authorize the action based upon the at least some of the user identification information and the vehicle identification information, in combination; and receiving, at the vehicle, authorization information authorizing the action to be performed when the user and the vehicle, are, in combination, authorized to perform the action.

9. The method of claim 8, the action related to at least one of:

refueling the vehicle;

parking the vehicle;

accessing a restricted area using the vehicle; or using a fee-based road segment.

10. The method of claim 8, comprising communicating at least some of the authorization information from the vehicle to a mechanism configured to perform the action.

11. The method of claim 8, comprising receiving authorization to perform the action for a specified period of time and the method comprising:

notifying the user when the specified period of time is within a predetermined time of lapsing.

12. The method of claim 11, comprising:

providing the user with an option to extend the specified period of time.

13. The method of claim 8, comprising providing a set of one or more service providers configured to assist in performing the action when the action is authorized.

14. The method of claim 13, the action related to parking the vehicle, and the method comprising:

reserving a parking location with at least one of the one or more service providers.

15. An authorization method, comprising:

receiving an authorization to perform an action, the authorization based upon user identification information pertaining to a user and yielded from a mobile device associated with the user and vehicle identification information pertaining to a vehicle of the user and yielded from the vehicle, the authorization comprising a spending limit associated with the action, the spending limit determined based upon the user identification information and the vehicle identification information; and allowing the action to be performed until the spending limit is satisfied based upon the authorization.

16. The method of claim 15, comprising:

receiving the user identification information;

receiving the vehicle identification information; and sending at least some of the user identification information and at least some of the vehicle identification information to an authorization system configured to determine whether to authorize the action based upon the user identification information and the vehicle identification information, in combination.

17. The method of claim 16, comprising receiving the user identification information and receiving the vehicle identification information from the vehicle.

18. The method of claim 15, receiving the authorization to perform the action comprising receiving the authorization to perform the action from the vehicle.

19. An authorization method, comprising:

receiving a first request to authorize an action when a first user is associated with a vehicle, the first request comprising:

first user identification information pertaining to the first user, and vehicle identification information pertaining to the vehicle;

determining, based upon the first user identification information and the vehicle identification information, that the first user and the vehicle, in combination, are authorized to perform the action;

receiving a second request to authorize the action when a second user is associated with the vehicle, the second request comprising:

second user identification information pertaining to the second user, and the vehicle identification information pertaining to the vehicle;

determining, based upon the second user identification information and the vehicle identification information, that the second user and the vehicle, in combination, are not authorized to perform the action.

20. The authorization method of claim 19, comprising:

issuing a transaction ID responsive to the first request based upon the first user and vehicle, in combination, being authorized to perform the action.

* * * * *